Jan. 6, 1970  E. G. FRANKEL  3,487,645
WAVE DAMPING DEVICE
Filed Aug. 21, 1968  2 Sheets-Sheet 2

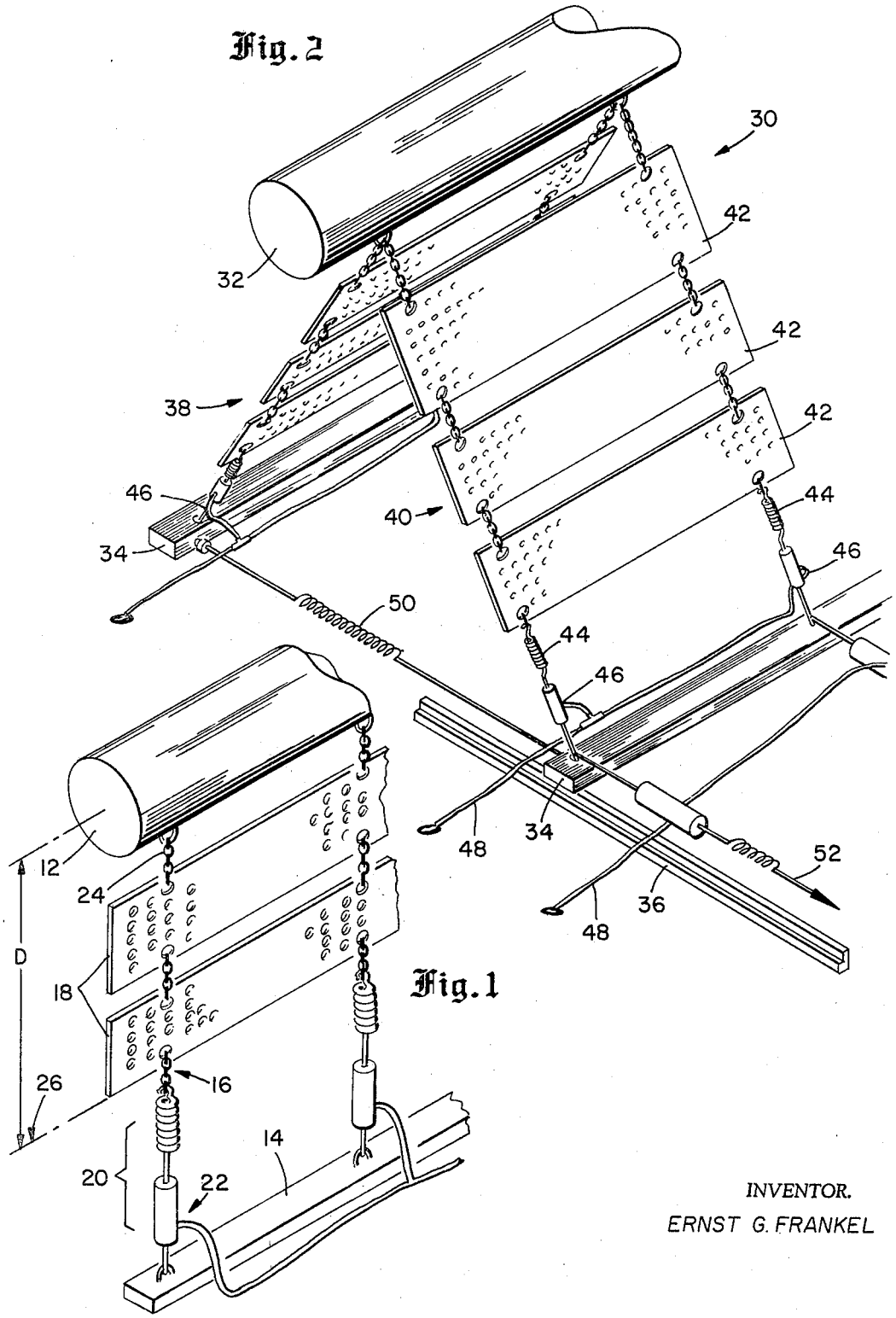

INVENTOR.
ERNST G. FRANKEL

United States Patent Office 3,487,645
Patented Jan. 6, 1970

3,487,645
WAVE DAMPING DEVICE
Ernst G. Frankel, Boston, Mass., assignor to Litton Systems, Inc., Beverly Hills, Calif., a corporation of Maryland
Filed Aug. 21, 1968, Ser. No. 754,272
Int. Cl. E02b 3/04
U.S. Cl. 61—3     7 Claims

ABSTRACT OF THE DISCLOSURE

A wave damping device having a buoyant elongated body anchored by connecting lines to the bottom of a liquid container. A spring-damper device having operable adjusting means is arranged in the lines so that upon adjustment thereof the wave damping device can be tuned to the present ambient wave spectrum of the liquid, resulting in a most effective wave-filtering or liquid motion energy-absorption device.

---

This invention relates to wave damping devices, but more particularly to a device adapted to smooth out waves in a liquid wherein the device possesses an operable adjusting means for tuning in conformity with amplitude and phase requirements of a particular wave spectrum.

The purpose of this device is to provide a means for damping waves in shallow waters, such as occur in the wells of ships, tanks of floating structures, swimming pools on ships, and shallow beaches. The device is particularly useful through its ability to effectively absorb the motion energy of waves in shallow waters which are horizontally restricted by a structure such as a tank or well and wherein the waves may be amplified or affected by the motion of the bottom of the well or tank.

It is well known that there is both a vertical and a horizontal displacement of water particles in a wave action. The vertical displacement is due to gravity, while the horizontal displacement is generally due to wind. Thus, the particles of water on or near the surface of a water wave move in a circular motion and the wave may be described as being orbital in nature. The wave form travels swiftly along the water surface, whereas the water particles oscillate back and forth and scarcely advance. The speed of the wave form is known as "wave velocity," while the speed of the water particles is callen "orbital velocity." Forces exerted by the waves on obstacles are primarily due to the orbital motion. The orbital velocities are largest at the surface and they decrease rapidly with depth until they cease entirely at a depth equal to the length of the wave. As waves reach shallow water, their velocity diminishes and the circular motion of the water particles that existed in deep water is squeezed to an elliptical motion due to the restrictive effect of the sea bottom.

Most conventional breakwaters are either of the fixed type that acts as a complete barrier to an entire wave or of the floating or drag type that acts as a drag barrier for the tops of the waves. The fixed-type of breakwater causes a reflection wave and an increase to the orbital velocity at the point of impact. However, they cannot be turned to absorb, i.e., exchange energy of the liquid motion, whereas the drag-type does absorb energy because of its anchoring devices which provide a certain "give" to the moving liquid.

The present disclosed device relates to a drag-type wave damping device in the first embodiment and to a drag-fixed-type wave damping device in the second and preferred embodiment. As a result, in the second or preferred embodiment, the advantages of both the drag and fixed-type wave damping device are combined. In short, the major advantages of the present invention comprise a first adjustability which assures various degrees of increase of lift and damping to conform with an amplitude and phase requirements of a particular wave spectrum, and a second adjustability which anchors the wave damping device configuration to conform as a drag or as a fixed-type device.

Briefly, the present invention provides a wave damping device for liquids which comprises a buoyant body, an anchor means and connecting means attaching the buoyant body and the anchor means. Damper-spring means, which are part of the connecting means, including an operable adjusting means, are arranged for tuning of the wave damping device in resonance with a wave configuration so that the maximum absorption of the displacement energy of liquid may be accomplished.

In the preferred embodiment, the wave damping device has a triangular configuration. Part of this triangular configuration comprises a buoyant body which is connected to a pair of anchoring elements arranged in spaced relationship and where a first connecting means and a second connecting means interconnects the buoyant body with each anchor means individually. Each interconnecting means is provided with a damper-spring means with an operable adjusting means incorporated therein. The operable adjusting means is adapted to be tuned individually so that the maximum absorption of liquid displacement energy can be accomplished by this wave damping device.

Accordingly, it is an object of the present invention to provide a wave damping device which can be adjusted to a variety of wave amplitudes whereby a maximum wave attenuation can be achieved for each particular wave spectrum.

It is another object of the present invention to provide a wave damping device which has a plurality of adjustable features for conforming the wave damping device to wave impacts and wave reflections for maximum energy absorption.

It is another object of the present invention to provide a wave damping device which can be altered into a drag-type or into a fixed-type wave damping device.

With these and other objects in view, the invention consists in the construction, arrangement and combination of various parts of the device whereby the objects contemplated are obtained, as hereinafter set forth, and illustrated by the accompanying drawings, wherein:

FIG. 1 is a perspective view of a first embodiment of a device constructed in accordance with the principles of the present invention;

FIG. 2 is a perspective view of a second and preferred embodiment of a device constructed in accordance with the principles of the present invention;

Figure 3:
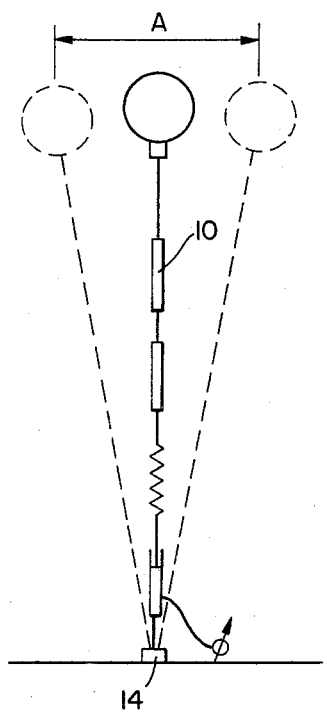
FIG. 3 is a side view of the device shown in FIG. 1.

Referring now to the drawings in more detail, there is shown in FIG. 1 a wave damping device which comprises an elongated buoyant body 12 anchored to an anchor 14 by connecting member 15. The buoyant body 12 preferably is a hollow metal tube which is made watertight, and the anchor 14 is connected to the bottom of a liquid-filled place and typically may comprise a steel bar.

The connecting member 16 includes various components such as a pair of perforated metal plates 18, a spring-damper device 20 having an adjusting apparatus 22. These components are interconnected by lines or chains, and hooks 24.

The adjusting apparatus 22 is preferably connected to a remote station so that it can be operated from that station (not shown) to vary the spring-damper means 20 to such an extent that the buoyant body 12 may be raised or lowered as required for a particular wave configuration. As a result, the buoyant body 12 is positioned for less than normal buoyancy during the passage of a wave trough and constrained to an increase of buoyancy during the passage of a wave crest. This will resolve in an energy absorption by the effect of the spring-damper device 20 and, accordingly, cause an exchange of potential kinetic energy, i.e., the wave damping device then acts as a wave filter accomplishing a degree of damping in relation to being tuned to a particular wave configuration.

As shown in FIG. 1, the metal plates are arranged at the upper portion of the connecting member 16 since the orbital velocity of the water particles in a moving body of liquid does not produce appreciable energy at a significant depth or level as has been mentioned above, such as indicated at a level 26. For the average presented waves, the distance D from the buoyant body to the level 26 will be equal to half, or less than half, of the full wave length of the water level.

In FIG. 2 the wave damping device 30 comprises a buoyant body 32 which is connected to a pair of spaced-apart anchor members 34 of which one is slidably positioned by means of a rail 36, or the like. The buoyant body 32 is connected to the anchor members 34 by interconnecting members 38 and 40 so that each interconnecting member forms an individual leg of a triangular-shaped wave damping device 30. Each of the interconnecting members 38 or 40 includes one or more perforated plates 42 and spring-damper device 44 having an adjustment system 46 coupled thereto.

In most instances it would be preferred that the adjustment system 46 is connected by a conductor 48 which terminates in a remote control station, where through electrical, pneumatic, mechanical or other well-known means, the system can be adjusted.

The anchor 34 is positioned parallel to each other and may be interconnected by a spring 50 or the like, which spring force in combination with the sliding arrangement of rail 36 and a pulling cable 52 provides a movable arrangement to leg 40 which enables the raising or lowering of the buoyant body 32.

As can be understood, various modifications can be provided to the construction of the wave damping device 30, as shown in FIG. 2, to accomplish the lowering or raising of the floating buoyant body 32.

Figure 5:
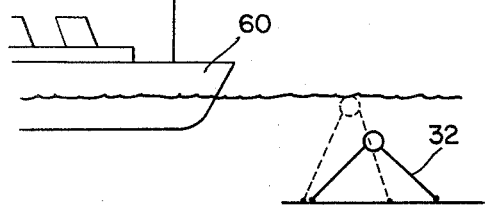
FIG. 5 is an outline sketch showing the horizontal adjustability of the wave damping device in relation to shipping water level and tides.

As shown in FIG. 5, a marine vessel 60 approaches the wave damping device 32 which has been lowered by the control station (not shown) so that easy passage can be obtained. Also, in areas with significant surface level variations, through ebb and tide or in tanks and wells, rough adjustment of the complete wave damping device can be easily obtained after which the finer adjustment will be taken care of.

Figure 4:
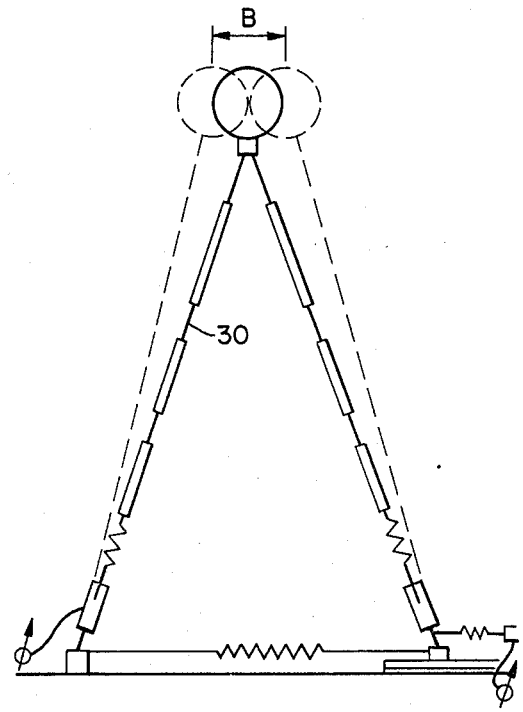
FIG. 4 is a side view of the device shown in FIG. 2.

Referring now to FIGS. 3 and 4, there are shown side views of the embodiments illustrated in FIGS. 1 and 2, respectively. As shown in FIG. 3, the wave damping device 10, through its connection to the anchor 14, is pivotally arranged and, depending on current and waves, it swings a certain arc A; while in FIG. 4, the damping device 30 swings through an arc B because of the triangular configuration.

Comparing FIG. 3 with FIG. 4, it is clear that the arc B is smaller than arc A. It will, therefore, be obvious to anybody familiar with this particular art that the embodiment shown in FIGS. 2 and 4 offers more adjustability. Thus, the spring-damper devices or, in other words, the spring and damping coefficients are adjustable in order to conform to the requirements of a particular wave pattern at any period of time.

Figure 6:
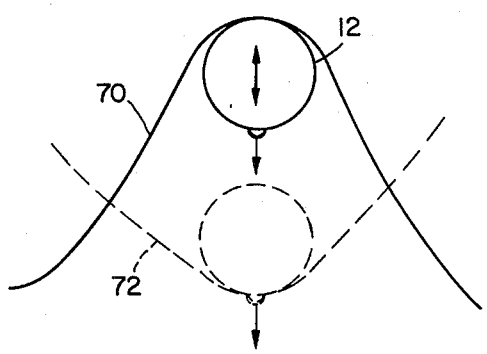
FIG. 6 is an exaggerated diagrammatic view showing the position of the buoyant body in relationship to a passing wave having a trough and crest.

Referring now to FIG. 6, there is shown, in an exaggerated fashion for explanatory purposes, the movement of a buoyant body of a wave damping device constructed according to the principles of the present invention, such as 12, during a wave crest 70 and a wave trough 72, respectively. As a result, when properly tuned, the buoyant body has less than normal buoyancy during the passage of a wave trough and is constrained to be lifted by the spring part of the spring-damper devices during the passage of a wave crest. The effect of the spring and damper relates directly to an energy absorption or an exchange of potential kinetic energy by this wave damping device. Thus, the wave damping device acts more or less as a wave filter which is easily tuned for any wave configuration to accomplish a maximum degree of wave damping.

It should be understood that the perforated plates can be replaced by other similar means and that the principle purpose is to block the water particles which are moving in their orbital velocity as discussed above, while the floating body or cylinder principally forms a barrier to the liquid and subdues the "wave velocity" which travels on the liquid surface, as discussed above.

The triangular configuration, as disclosed in FIGS. 2 and 4, has an additional feature when used in a ship well configuration because not only the incoming waves are being damped, but also the effect of the waves reflected from the bulkheads will be reduced through the unique arrangement of the spring-damper devices 44 in each of the interconnecting members 38 and 40.

Therefore, while there has been disclosed what presently appears to be the preferred embodiment and a second embodiment of the invention, it should be understood that changes and modifications can be made therein without departing from the essential spirit of the invention. It is intended, therefore, in the appended claims to cover all such changes and modifications within the true scope of the invention.

What is claimed is:

1. A wave damping device for liquids, comprising:
   a buoyant body;
   an anchor means;
   connecting means attached to said body and said anchor means;
   damper-spring means being part of said connecting means; and
   operable adjusting means incorporated with said damper-spring means for tuning said wave damping device to a present associated wave configuration for maximum absorption of liquid displacement energy.

2. A wave damping device, as claimed in claim 1, wherein the tuning of said operable adjusting means is accomplished by remote control.

3. A wave damping device, as claimed in claim 1, wherein said buoyant body is elongatedly shaped and comprises high positive buoyancy qualities.

4. A wave damping device, as claimed in claim 1, wherein said connecting means includes at least one flat sheet of perforated material for assisting in the liquid particle displacement attenuation.

5. A wave damping device for liquids, comprising:
   a buoyant body;
   a first and a second anchor means;
   a first connecting means interconnecting said body with said first anchor means, and a second means interconnecting said body with said second anchor means;
   a first and a second damper-spring means being part of said first and said second connecting means, respectively; and operable adjusting means incorporated with each said damper-spring means for tuning said wave damping device for maximum absorption of liquid displacement energy.

6. A wave damping device, as claimed in claim 5, wherein said device when in its operable position resembles a triangular configuration.

7. A wave damping device, as claimed in claim 5, wherein at least one leg of the triangle is adjustable so that said triangular apex can be positioned at a predetermined height.

References Cited

UNITED STATES PATENTS

| | | | |
|---|---|---|---|
| 225,125 | 3/1880 | Haupt | 61—2 |
| 877,201 | 1/1908 | Kellner | 61—3 |
| 2,185,458 | 1/1940 | Giliasso | 61—5 |
| 2,928,250 | 3/1960 | Smith | 61—5 |
| 3,022,632 | 2/1962 | Parks | 61—3 |
| 3,222,871 | 12/1965 | Miller et al. | 61—5 |

PETER M. CAUN, Primary Examiner

UNITED STATES PATENT OFFICE
CERTIFICATE OF CORRECTION

Patent No. 3,487,645                                      January 6, 1970

Ernst G. Frankel

It is certified that error appears in the above identified patent and that said Letters Patent are hereby corrected as shown below:

Column 1, before line 24, insert as a new paragraph "The invention herein described was made in the course of, or under contract or subcontract thereunder, with the Department of the United States Navy."; line 63, "turned" should read -- tuned --.

Signed and sealed this 29th day of December 1970.

(SEAL)
Attest:

Edward M. Fletcher, Jr.

Attesting Officer

WILLIAM E. SCHUYLER, JR.

Commissioner of Patents